(12) United States Patent
Thomas (10) Patent No.: US 6,567,101 B1
(45) Date of Patent: May 20, 2003

(54) SYSTEM AND METHOD UTILIZING MOTION INPUT FOR MANIPULATING A DISPLAY OF DATA

(75) Inventor: Keith C. Thomas, Vermillion, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/416,983

(22) Filed: Oct. 13, 1999

(51) Int. Cl.⁷ ................................................ G09G 5/34
(52) U.S. Cl. ....................... 345/649; 345/659; 345/660; 345/689
(58) Field of Search ............................... 345/123, 126, 345/127, 684, 660, 667, 670, 671, 689

(56) References Cited

U.S. PATENT DOCUMENTS

| | | | | |
|---|---|---|---|---|
| 5,067,167 A | * | 11/1991 | Berger | 345/126 |
| 5,189,404 A | * | 2/1993 | Masino et al. | 345/126 |
| 5,453,764 A | * | 9/1995 | Inagaki | 345/126 |
| 5,516,105 A | | 5/1996 | Eisenbrey et al. | 273/148 |
| 5,526,481 A | | 6/1996 | Parks et al. | 395/155 |
| 5,602,566 A | * | 2/1997 | Motosyuku | 345/126 |
| 5,661,632 A | | 8/1997 | Register | 361/683 |
| 5,686,940 A | * | 11/1997 | Kuga | 345/127 |
| 5,710,572 A | * | 1/1998 | Nihei | 345/127 |
| 5,734,371 A | | 3/1998 | Kaplan | 345/158 |
| 5,754,168 A | | 5/1998 | Maynard, Jr. | 345/163 |
| 5,880,717 A | | 3/1999 | Chan et al. | 345/173 |
| 5,883,619 A | | 3/1999 | Ho et al. | 345/163 |
| 5,910,797 A | | 6/1999 | Beuk | 345/157 |

FOREIGN PATENT DOCUMENTS

| | | | |
|---|---|---|---|
| EP | 0 805 389 A2 | 4/1997 | G06F/3/033 |
| EP | 0 825 514 A2 | 8/1997 | G06F/1/16 |
| WO | WO 99/18495 | 4/1999 | G06F/3/147 |

OTHER PUBLICATIONS

Patent Abstracts of Japan; Application No.: 09252258; Application Date: Sep. 17, 1997; Applicant: Citizen Watch Co, Ltd.; Inventor: Enokida Michihiro; Title: Pointing Device; Publication Date: Apr. 9, 1999.

"Situated Information Spaces and Spatially Aware Palmtop" Communications of the Association for Computing Machinery, US, Association for Computing Machinery, New York; Jul. 1, 1993, vol. 36, No. 7.

"Image Orientation Sensing and Correction or Notepads" Research Disclosure, Kenneth Mason Publications, Hampshire, GB; Mar. 1, 1993, No. 3347.

\* cited by examiner

Primary Examiner—Matthew Luu
(74) Attorney, Agent, or Firm—Scott Charles Richardson; William J. Breen, III; Suiter & Associates (57) ABSTRACT

The present invention relates to a system and method for manipulating a display of data by utilizing motion input. In an exemplary embodiment, a digital information appliance suitable for utilization of motion input and for display of data includes a detector for detecting rotation of the digital information appliance about an axis and a display device for displaying data. Wherein, a display of data is manipulated in response to the detected rotation. In an additional exemplary embodiment, a digital information appliance suitable for utilization of motion input and for display of data includes a detector for detecting translation of a digital information appliance along an axis and a display device for displaying data. Wherein, a display of data is at least one of enlarged and reduced in response to the detected translation. In a further exemplary embodiment, a digital information appliance, suitable for utilization of motion input and for display of data, includes a detector for detecting rotation of the digital information appliance about an axis and a display device for displaying data. A display of data is orientated on the display device with respect to an environment surrounding the digital information appliance. Wherein, the display of data is manipulated for viewing on the display device so as to keep the display of data orientated on the display device with respect to an environment. Therefore, the orientation of the display of data is not affected by the rotation of the digital information appliance about an axis.

44 Claims, 7 Drawing Sheets

SYSTEM AND METHOD UTILIZING MOTION INPUT FOR MANIPULATING A DISPLAY OF DATA

FIELD OF THE INVENTION

The present invention generally relates to the field of digital information appliances and particularly to a system and method utilizing motion input for manipulating a display of data on a digital information appliance.

BACKGROUND OF THE INVENTION

Digital information appliances have become a popular way of providing specialized functionality to a user in a variety of locations. For example, digital information appliances may be utilized to navigate through the Internet, act as an organizer, an electronic book, integrated with a wireless phone, or the like to enable functional elements to be combined per the specific needs of a user. However, the needs of a user are typically not limited to a home or office. Oftentimes, a user desires the use of the digital information appliance in an expanded range of locations. To manipulate data displayed by the digital information appliance, users typically utilize input devices, such as buttons, touch-pads and touch screens. Manipulation of a display of data may include movement of the display of data across a display device, such as scrolling, controlling a display of a cursor, enlarging and reducing a display of the data, or the like.

One known method utilized to manipulate a display of data employed the movement of a mouse. Typically, a mouse requires the use of a surface to actuate a roller assembly. The requirement of a surface made the use of such a device unsuitable for a variety of applications. For example, if a user wanted to manipulate the display of data while the digital information appliance was hand-held, the user would either have to operate an additional input device or find a surface to use a mouse. Adding additional input devices arranged on the appliance necessitated both an increase in the volume of the device and an increase in the surface area of the device as each additional component was included. The requirement of utilizing a surface presents obvious limitations when employed as a hand-held device.

An additional problem encountered by users of digital information appliances is viewing a display of data on a digital information appliance as the distance between the user and the appliance changes. For example, display devices of most hand-held digital information appliances are reduced in area to increase the mobility of the device. However, there are many instances when a display of data is larger than the available display area of the display device. Typically, the data is displayed in a diminished format to enable viewing of a greater portion of the data on the display at one time. For example, a display of data is made smaller so as to enable a greater portion of the data to be displayed on the display device. However, viewing data in a diminished format requires the user to position the digital information appliance closer to the user to view the details of the displayed data. Viewing the data in an enlarged format, although permitting the user to view the data from increased distances, limited the user to viewing a smaller portion of the data.

Therefore, it may be advantageous to provide a system and method for utilizing motion input to manipulate a display of data.

SUMMARY OF THE INVENTION

Accordingly, the present invention is directed to a digital information appliance employing motion input to manipulate a display of data. In an exemplary embodiment, a digital information appliance suitable for using motion input and for displaying data includes a detector for detecting rotation of the digital information appliance about an axis and a display device for displaying data. A display of data is manipulated in response to the detected rotation in a manner corresponding to the detected rotation.

To enable greater utilization of a display area of a display device, it may be preferable to use motion input to display more data while the digital information appliance is close to the user and also enable a user to view information on the appliance from an increased distance. In an exemplary embodiment, a detector is used to detect translational movement of the digital information appliance wherein a display of data is at least one of enlarged and reduced in response to the detected translation.

In a further exemplary embodiment, a digital information appliance includes a detector for detecting rotation of the digital information appliance about an axis and a display device for displaying data. A display of data is orientated on the display device with respect to an environment surrounding the digital information appliance. The display of data is manipulated for viewing on the display device so as to keep the display of data orientated on the display device with respect to an environment. Therefore, the orientation of the display of data is not affected by the rotation of the digital information appliance about an axis with respect to a user.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, digital information appliances in accordance with an exemplary embodiment of the present invention are shown. In various embodiments, such digital information appliances may be used as electronic books, organizers, personal digital assistants, digital music players, wireless networking interfaces, Internet viewing appliances and the like to provide a user with desired functionality. A digital information appliance employing the present invention may be used to view and interact with both text and graphics.

In accordance with the present invention, a digital information appliance is described which is capable of movement, such as rotational and/or translational movement. As discussed herein, rotational movement includes rotation about an axis, and translational movement includes movement along an axis. To simplify the discussion of the present invention, three axes, X-axis 112, Y-axis 114, and Z-axis 116 are supplied in the drawings and made a part of the discussion to provide perspective. Further, the terms "top", "bottom", "left" and "right" are used to describe portions of an exemplary digital information appliance in no way limit the present invention. The terms are used to aid in a description of an embodiment of the invention. The present invention is not limited to those directions and orientations, the form herein described merely being an exemplary embodiment thereof.

Figure 1A:
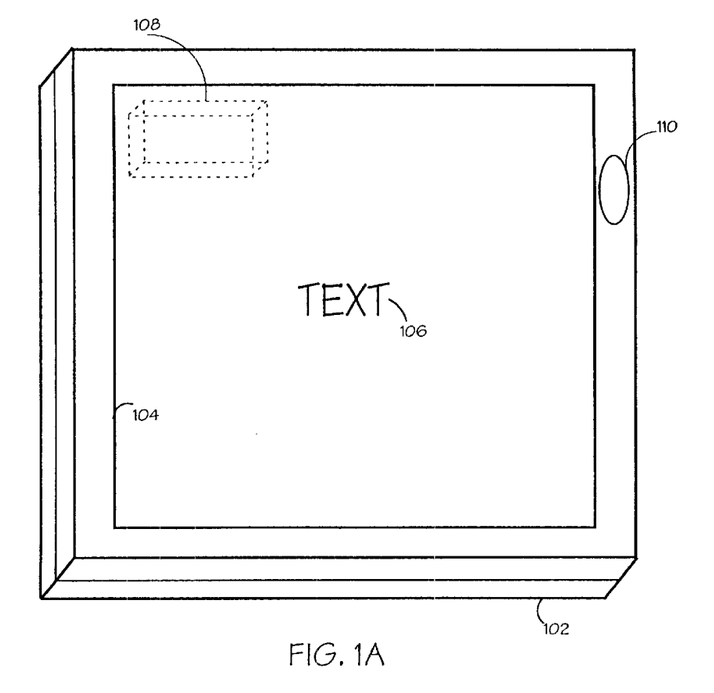
FIG. 1A depicts an exemplary digital information appliance employing the present invention.
Figure 1B:
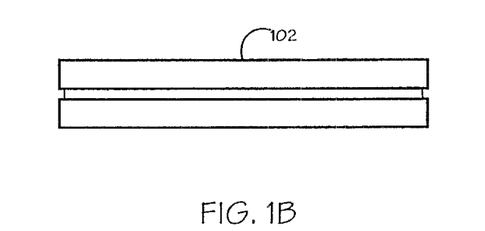
FIG. 1B is a side view of the digital information appliance shown in FIG. 1A.
Figure 1C:
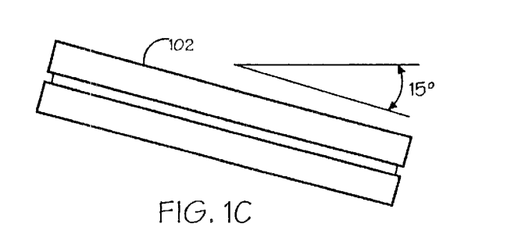
FIG. 1C is a side view of the digital information appliance of FIG. 1A illustrating rotation of the digital information appliance.

Referring now to FIG. 1A, an exemplary digital information appliance employing the present invention for manipulation of data in response to motion input is shown. The digital information appliance 102 includes a display 104 for displaying data 106, such as text, graphics or the like. A detector 108 is included with the digital information appliance 102 to detect motion input of the digital information appliance 102. In an exemplary embodiment, motion input includes rotation of the digital information appliance 102 about an axis. In response to the detected rotation, the display of data 106 is manipulated. For example, a display of data 106 is scrolled along a display device 104 corresponding to the direction of rotation. In FIG. 1B, a side-elevation view of the exemplary digital information appliance 102 of FIG. 1A is shown. The digital information appliance 102 is shown in a first orientation. As the digital information appliance 102 is rotated, as shown in FIG. 1C, the detector 108 detects the rotation of the digital information appliance 102.

Rotation may be detected utilizing a wide variety of detectors without departing from the spirit and scope of the present invention. For example, rotation may be detected with the use of an inclinometer. One method of utilizing an inclinometer detects a change in the incline of a digital information appliance 102 to detect rotation of the digital information appliance 102, as shown in FIGS. 1B and 1C. For example, a digital information appliance 102 begins in a starting orientation as shown in FIG. 1B. Once the digital information appliance 102 is rotated, as shown in FIG. 1C, the inclinometer detects the change in orientation, so that the display of data may be manipulated. In a preferred embodiment of the present invention, a change in orientation due to a defined amount of rotation continues to manipulate the display of data in a predefined manner. For example, as shown in FIG. 1C, rotating a digital information appliance 102 to a predetermined angle, for example, fifteen degrees or more, acts to continually scroll a display of data in a corresponding direction. In an additional embodiment, a display of text may be scrolled in an amount or at a rate proportional to the amount of detected movement, such as degree of rotation, magnitude of force, or the like. For example, the greater the magnitude of force or degree of rotation, the greater the degree of manipulation, such as the amount that a display of data is scrolled across a display device.

A digital information appliance may also utilize an accelerometer to detect the acceleration of the digital information appliance, and therefore the rotation of the appliance. Magnitudes and direction of the acceleration may also be utilized to determine rotation. For example, by utilizing an accelerometer capable of determining acceleration in a given direction, a digital information appliance detects the acceleration and therefore detects rotation. In another embodiment, a gravity sensor may detect translation of a digital information appliance by detecting variations in the force of gravity on the device. In yet a further embodiment, translation may be detected with the use of positional sensors to detect changes in the orientation of the digital information appliance with respect to its surrounding environment and therefore the rotation of the digital information appliance. Positional sensors may include an infrared sensor, sensors that utilize waves to determine position relative to surroundings, such as ultrasonic sensors utilizing techniques similar to radar systems, and the like. It should be apparent that a wide variety of detectors may be employed by the present invention as contemplated by a person of ordinary skill in the art and not depart from the spirit and scope of the present invention.

Additionally, it may be preferable to include a calibrator as shown in FIG. 1A to calibrate a beginning orientation of the digital information appliance. In this way, rotation detected by the detector may begin from a beginning point, as shown in FIGS. 1B, 2A, 3A and 4A. For example, a user desiring to utilize a digital information appliance in different orientations, such as level, held out in front of him, or the like may use those different orientations as a beginning point. For instance, a calibrator may use the detected orientation from the detector 108 (FIG. 1) as a beginning point, and any movement from that orientation is used to manipulate a display of data. Therefore, by utilizing a calibrator, rotation may be measured from any beginning orientation. A calibrator may be automatically activated, such as measuring time in a particular orientation, and if time spent in that orientation is above a specific amount, that orientation is utilized as the beginning orientation. Additionally, the calibrator may be manually activated, such as by depressing a button 110 on the device once the digital information appliance is placed in a desired orientation. It should be apparent that a person of ordinary skill in the art may utilize a wide variety of methods and devices for calibrating a digital information appliance in an orientation and not depart from the spirit and scope of the present invention.

Figures 2A, 2B, 2C:
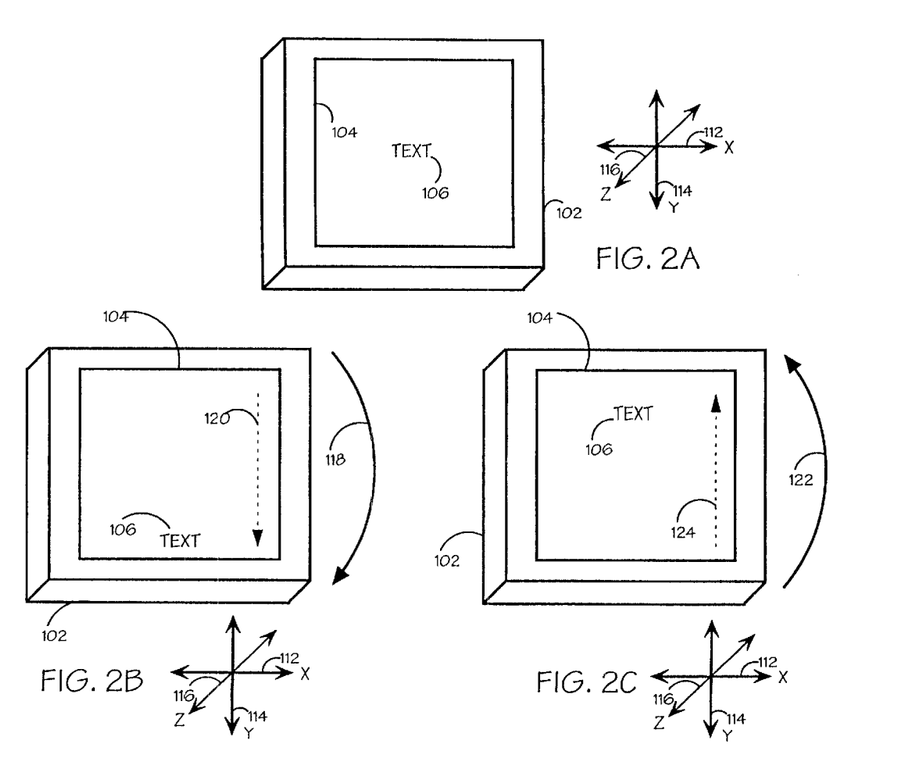
FIG. 2A depicts an exemplary digital information appliance as shown in FIG. 1A wherein the digital information appliance is in an original orientation with data including text displayed on the center of a display device.
FIGS. 2B through 2E illustrate the digital information appliance as shown in FIG. 2A wherein manipulation of a display of data including text in response to motion input including rotational movement is shown.

In an exemplary embodiment, manipulation of the display of data includes scrolling the display of data on a display device in response to detected rotation, as shown in FIGS. 2A through 2E. In FIG. 2A, an exemplary digital information appliance 102 is shown in a beginning orientation with the display of data 106 centered on the display device 104. As the digital information appliance 102 is rotated about an axis, the display of data 106 is scrolled in a corresponding direction. For example, as shown in FIG. 2B, the digital information appliance 102 is rotated 118 about the X-axis 112 so as to move the digital information appliance 102 through the Y-axis 114 and Z-axis 116. The display of data 106 is scrolled along Y-axis 114 on the display device 104 in a direction 120 corresponding to the rotation 118 of the digital information appliance 102 through the Y-axis 114 and Z-axis 116. In this instance, the display of data 106 is scrolled toward the bottom of the display device 104. The digital information appliance 102 may also be rotated 122 in an opposite direction about the X-axis 112 through the Y-axis 114 and Z-axis 116 to scroll the display of data 106 in a corresponding direction towards 124 the top of the display device 104, as shown in FIG. 2C.

Figure 2D:
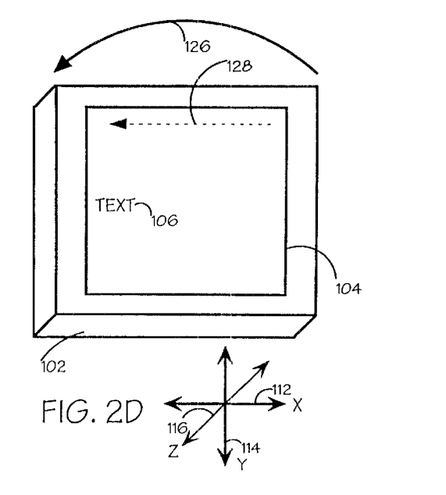
Figure 2E:
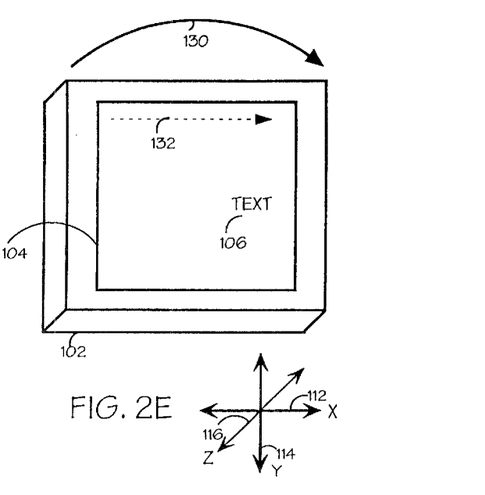

Additionally, the detector may detect a second axis of rotation so as to enable a digital information appliance to manipulate a display of data in response to the detected rotation about the second axis. In an exemplary embodiment, a digital information appliance 102 is rotated about the Y-axis 114, as shown in FIG. 2D, thereby moving the digital information appliance 102 through the X-axis 112 and Z-axis 116. A display of data 106 is then scrolled on the display device 104 in a direction 128 corresponding to the rotation 126 of the digital information appliance 102. In this instance, the display of data 106 is scrolled toward the left edge of the display device 104. As shown in FIG. 2E, the digital information appliance 102 is rotated 130 about the Y-axis 114 in a direction 130 opposite to the rotation 126 shown in FIG. 2D to scroll the display of data 106 in a direction 132 across the display device 104 to the right. By manipulating the display of data 106 in a direction on the display device 104 corresponding to the detected rotation, a user may manipulate the display of data 106 in an intuitive manner.

Figure 3A:
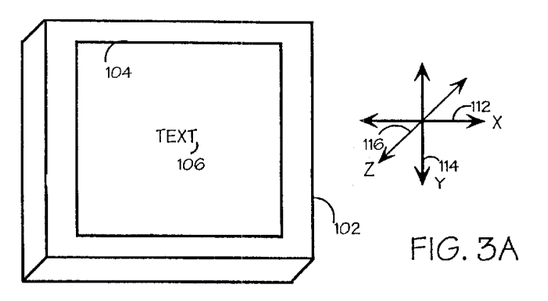
FIG. 3A depicts an exemplary digital information appliance as shown in FIG. 1A wherein a digital information appliance is in an original orientation with data including text displayed on the center of a display device.
Figure 3B:
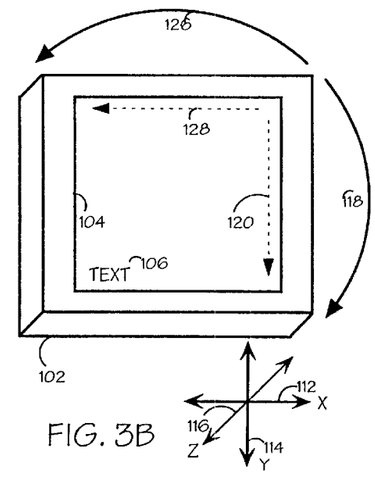
FIGS. 3B through 3E illustrate a digital information appliance as shown in FIG. 3A wherein manipulation of a display of data including text in response to motion input including rotational movement along two axes is shown.
Figure 3C:
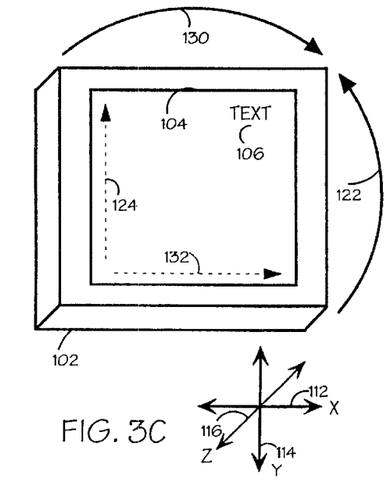

Referring now to FIGS. 3A through 3E, rotation about two axes to manipulate the display of data is shown. In FIG. 3A, a digital information appliance 102 is shown in a beginning orientation with a display of data 106 centered on a display device 104. As the digital information appliance 102 is rotated about two axes, the display of data 106 is scrolled in response in a direction corresponding to both detected rotational inputs. For example, as shown in FIG. 3B, as the digital information appliance 102 is rotated 126 about the X-axis 112 and also rotated 118 about the Y-axis 114 the display of data 106 is scrolled across the display device 104. In this instance, the display of data 106 is scrolled in a direction corresponding to the direction of rotation. As the digital information appliance 102 is rotated 118 through the Y-axis 114 and Z-axis 116, the display of data 106 is scrolled in a corresponding direction 120 on the display device 104. Likewise, as the digital information appliance 102 is rotated 126 through the X-axis 112 and Z-axis 116, the display of data 106 is scrolled in a corresponding direction 128 on the display device 104. The digital information appliance 102 may also be rotated 130 about the Y-axis 114 and rotated 122 about the X-axis 112 to scroll the display of data 106 across the display device 104 in an opposite direction 124 and 132, as shown in FIG. 3C.

Figure 3D:
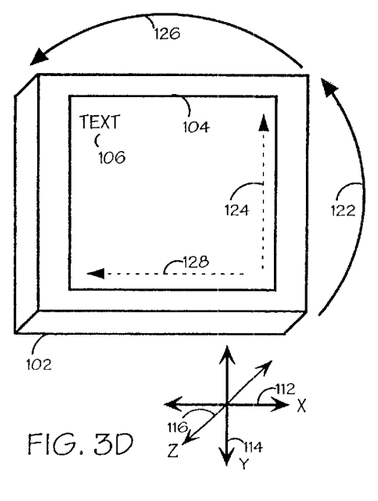
Figure 3E:
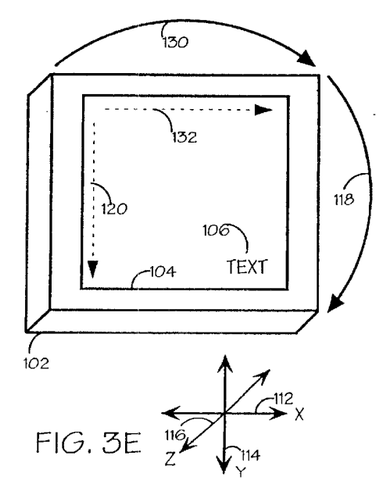

A digital information appliance 102 may detect additional combinations of rotation to manipulate a display of data. For example, as shown in FIG. 3D, a digital information appliance 102 detects rotation 122 about the X-axis 112 to scroll the display of data 106 in a corresponding direction 124 across the display device 104, as also shown in FIGS. 3C and 2C. However, the digital information appliance 102 also detects rotation 126 about the Y-axis 114, to scroll the display of data 106 in a corresponding direction 128 across the display device 104, as also shown in FIGS. 3B and 2D. The combination of the two detected rotations 126 and 122 results in the display of data 106 being scrolled towards the upper left corner of the display device 104. The rotation of the digital information appliance 102 may be reversed to scroll the display of data 106 toward the lower right corner of the display device 104, as shown in FIG. 3E. In this embodiment, the digital information appliance 102 is rotated 130 about the Y-axis 114 through the X-axis 112 and Z-axis 116 to scroll the display of data 106 in a corresponding direction 132 across the display device 104. The digital information appliance 102 is also rotated 118 about the X-axis 112 through the Y-axis 114 and Z-axis 116 to scroll the display of data 106 in a corresponding direction 120 across the display device 104. The combination of the two detected rotations 118 and 130 is utilized to scroll the display of data 106 in the two corresponding directions 120 and 132 towards the bottom right side of the display device 104.

Figure 4A:
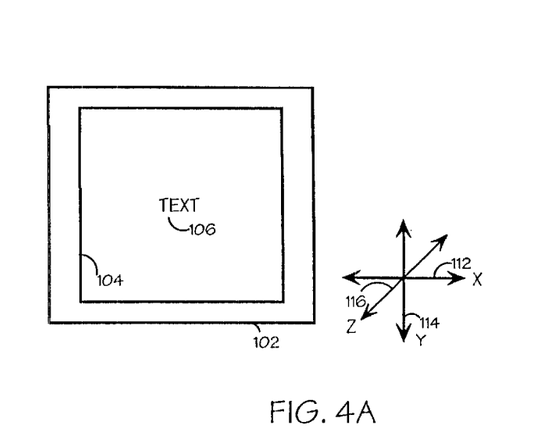
FIG. 4A illustrates an exemplary digital information appliance as shown in FIG. 1A wherein a digital information appliance is in an original orientation with data including text displayed on the center of a display device.
Figure 4B:
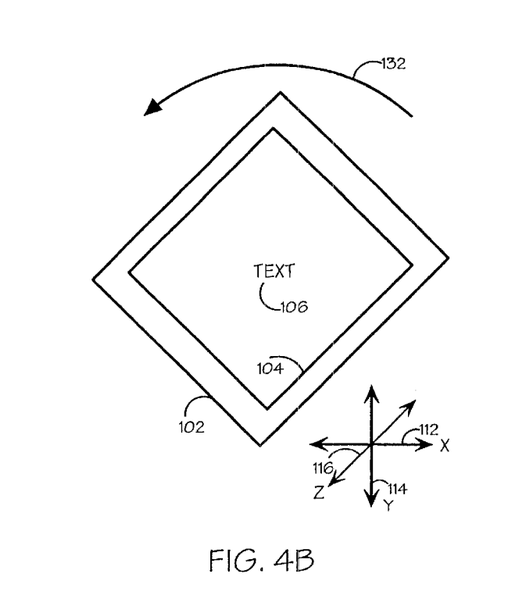
FIGS. 4B and 4C illustrate a digital information appliance as shown in FIG. 4A wherein the digital information appliance may utilize detected rotational movement about an axis to manipulate data so as to keep the display of data oriented with respect to a user.
Figure 4C:
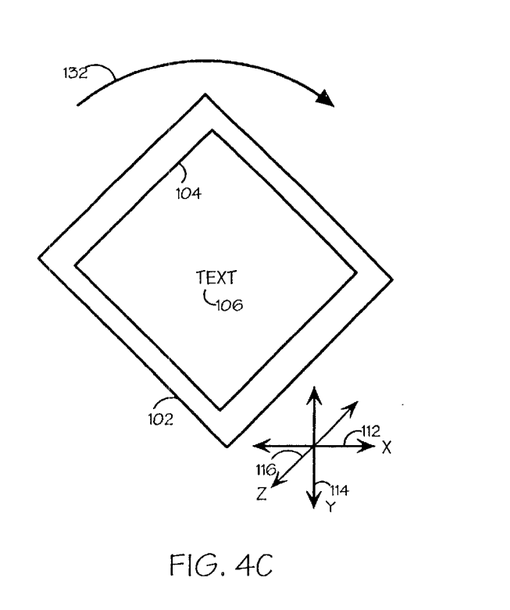

Referring now to FIGS. 4A through 4C, an exemplary digital information appliance using detected rotational movement to manipulate data is shown. In this embodiment, the display of data is kept oriented with respect to a point of reference, such as the environment surrounding the digital information appliance, so as not to be affected by the rotation of the digital information appliance. For example, a digital information appliance 102 in a beginning orientation with the display of data 106 centered on the display device 104 is shown in FIG. 4A. As the digital information appliance 102 is rotated about the Z-axis 116, the display of data 106 is manipulated, as shown in FIG. 4B. In this instance, the display of data 106 is manipulated so as to remain in generally the same orientation on the display device 104 with respect to a point of reference, such as the X-axis 112 and Y-axis 114 as shown in FIG. 4A. Likewise, as shown in FIG. 4C, if a digital information appliance 102 is rotated 132 about the Z-axis 116 through the X-axis 112 and Y-axis 114, the display of data 106 remains oriented with respect to a point of reference, shown as the X-axis 112 and Y-axis 114.

Figure 5A:
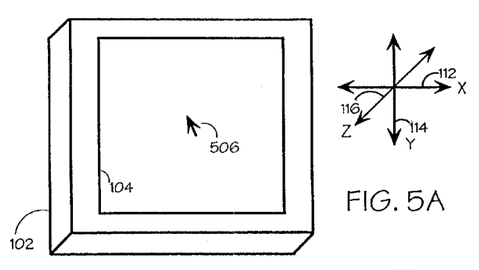
FIG. 5A illustrates an exemplary digital information appliance as shown in FIG. 1A wherein the digital information appliance is in an original orientation with data including text displayed on the center of a display device.
Figure 5B:
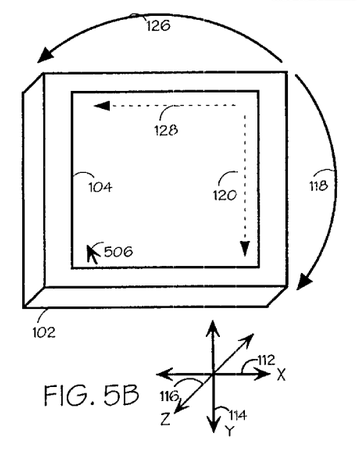
FIGS. 5B through 5E illustrate a digital information appliance as shown in FIG. 5A wherein manipulation of a display of data including text in response to motion input including rotational movement along two axes is shown.
Figure 5C:
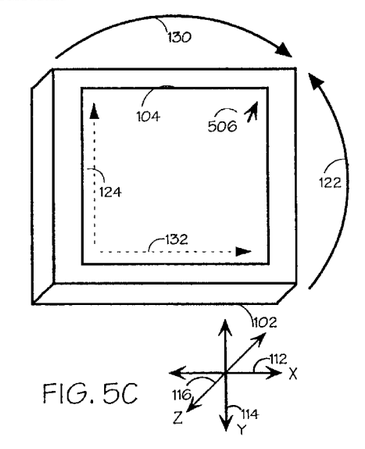

A wide variety of data displayed on a device may be manipulated and not depart from the spirit and scope of the present invention. Although descriptions herein refer to the display of text, it will be appreciated by those skilled in the art that graphic as well as textual data may be manipulated according to the present invention. Also, while for the sake of clarity descriptions herein treat the data to be manipulated as the entire contents of the display of the appliance, those skilled in the art will appreciate that contents within portion of the display, such as may be displayed within designated windows, may be manipulated in accordance with this specification without departing from the spirit of the present invention. For example, as shown in FIGS. 1A though 4C, the display of text is manipulated by scrolling the display of text so as to orient the display of text on a display device. A display of a cursor may also be manipulated and not depart from the present invention. As shown in FIGS. 5A through 5E, detecting rotational movement of a digital information appliance 102 controls a display of a cursor 506. The display of a cursor 506 is scrolled across a display device 104 utilizing any of the methods previously discussed. For example, a digital information appliance 102 is shown in a beginning orientation with the display of a cursor 506 centered on the display device 104. As the digital information appliance 102 is rotated about two axes, the display of a cursor 506 may be scrolled in response in a direction corresponding to both detected rotational inputs. For example, as shown in FIG. 5B, as the digital information appliance 102 is rotated 126 about the X-axis 112 and also rotated 118 about the Y-axis 114, a display of a cursor 506 is scrolled across the display device 104. In this instance, the display of a cursor 506 is scrolled in a direction corresponding to the direction of rotation. As the digital information appliance 102 is rotated 118 through the Y-axis 114 and Z-axis 116, the display of a cursor 506 may be scrolled in a corresponding direction 120 on the display device 104. Likewise, as the digital information appliance 102 is rotated 126 through the X-axis 112 and Z-axis 116, the display of a cursor 506 may be scrolled in a corresponding direction 128 on the display device 104. The digital information appliance 102 may also be rotated 130 about the Y-axis 114 and rotated 122 about the X-axis 112 to scroll the display of a cursor 506 across the display device in an opposite direction 124 and 132, as shown in FIG. 5C.

Figure 5D:
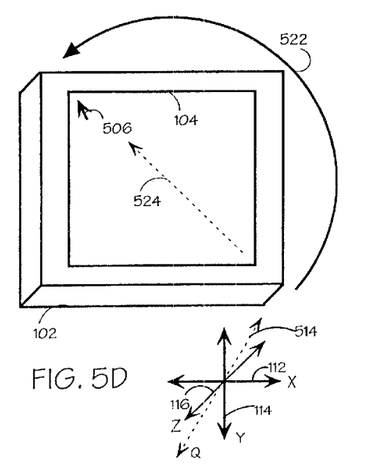
Figure 5E:
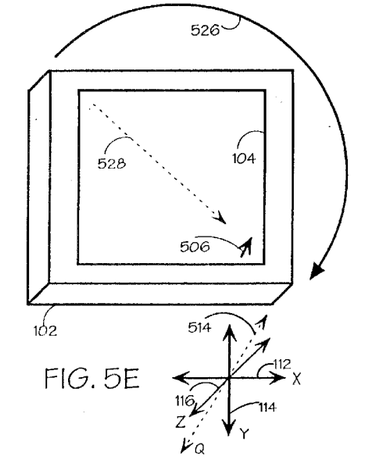

Rotation about two axes may also be described with the use of a nonorthogonal axis. A nonorthogonal axis includes any axis oriented between the X-axis 112, Y-axis 114 and Z-axis 116. For example, as shown in FIG. 5D, a nonorthogonal axis is defined as the Q-axis 514. The digital information appliance 102 is rotated 522 about the Q-axis 514, similar to the rotation about two axes as described in FIG. 3D. The display of the cursor 506 is scrolled on the display device 104 in a direction 524 corresponding to the rotation 522 about the Q-axis 514 of the digital information appliance 102. In this instance, the display of a cursor 506 is scrolled toward the top-left of the display device 104. Further, the digital information appliance 102 may be rotated 526 in an opposite direction about the Q-axis 514 to scroll the display of the cursor 106 in a corresponding direction 528, in this instance towards the bottom-right of the display device 104, as shown in FIG. 5E.

Figure 6A:
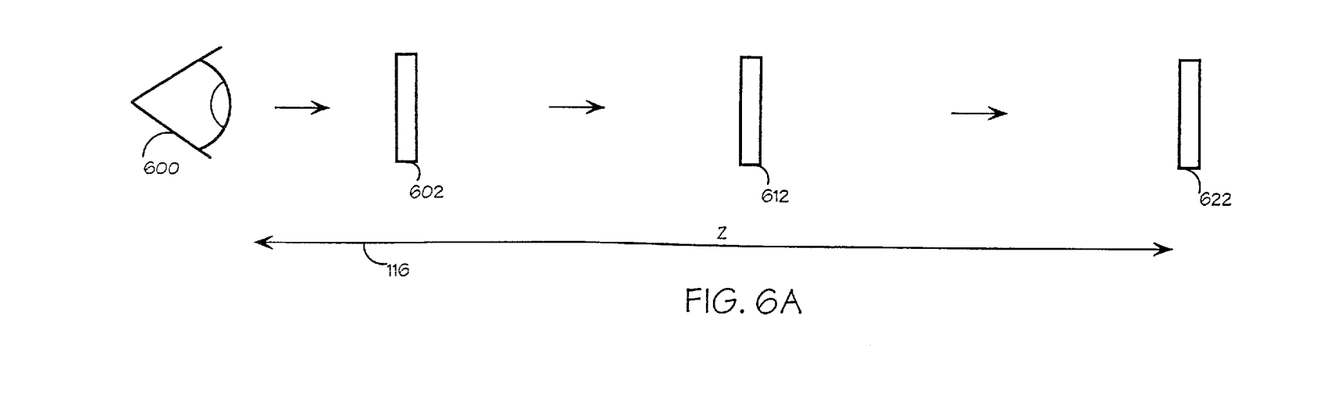
FIG. 6A illustrates an exemplary digital information appliance wherein a plurality of digital information appliances disposed at a variety of positions along an axis from a user is shown.
Figure 6B:
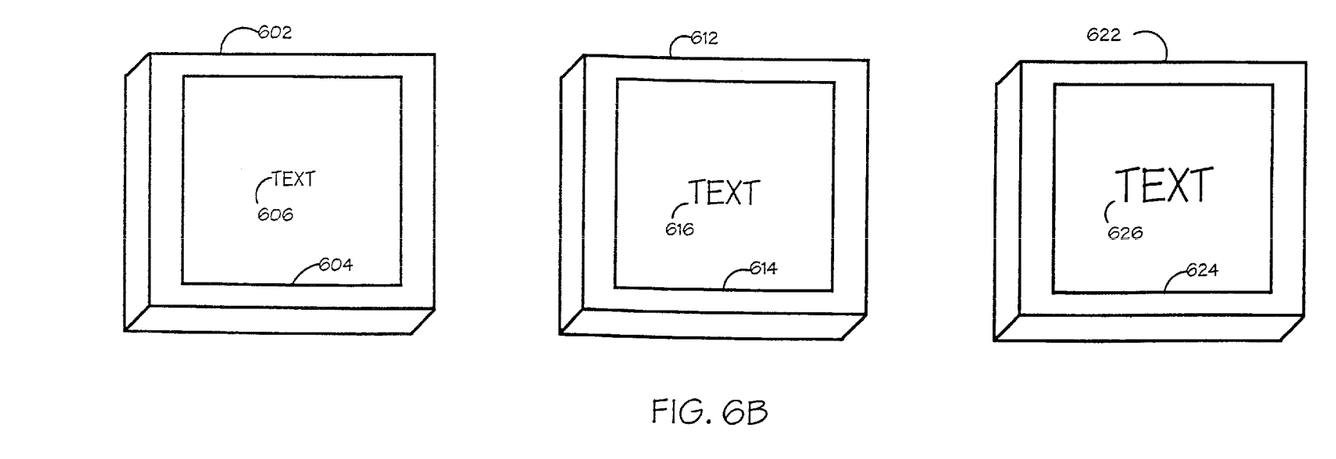
FIG. 6B illustrates the plurality of digital information appliances of FIG. 6A wherein text is manipulated in response to the position of the digital information appliance from the user.

Translational movement along an axis may also be used to manipulate a display of data. Referring now to FIG. 6A, an exemplary digital information appliance 602, 612 and 622 is shown at varying distances from a user 600. As the distance of the digital information appliance from the user 600 is increased, the data displayed on the digital information appliance is manipulated accordingly. For example, as the digital information appliance 602 is positioned close to a user 600, a display of text 606 is displayed on the display device 604 in a reduced fashion, as shown in FIG. 6B. The reduced view of the display of text 606 enables an increased amount of data to be displayed. As the digital information appliance 612 is translated away from the user 600 along the Z-axis 116, the display of text 616 is enlarged in relation to the display device 614. As the digital information appliance 622 is translated even further away from the user 600 along the Z-axis 116, the display of text 626 is even further enlarged with respect to the display device 624 to enable a user to view the display of text 626 over greater distances. In this way, the display of text may be enlarged and reduced in response to the translation of a digital information appliance along an axis, such as the Z-axis 112. Additionally, it should be apparent that various portions of the display of data may be enlarged or reduced to correspond to the distance from a user. For example, if the digital information appliance is orientated at an angle from the user, the portion of the appliance further away from the user may be enlarged accordingly.

Figure 7:
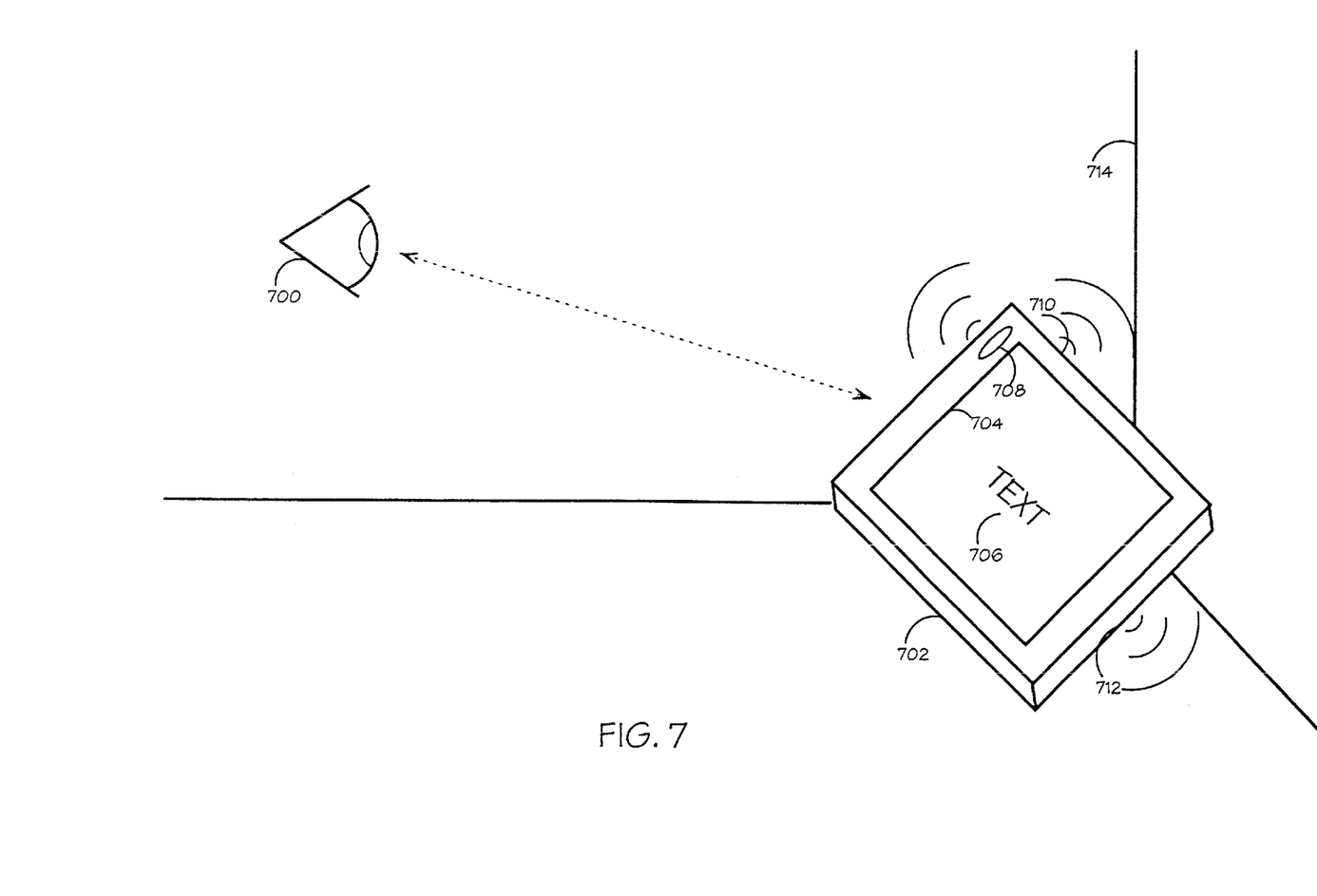
FIG. 7 illustrates an exemplary digital information appliance wherein a digital information appliance suitable for utilizing positional sensors is shown.

Translation of a digital information appliance may be detected in a wide variety of ways. In one embodiment, a digital information appliance uses an accelerometer to detect the acceleration of the digital information appliance. The magnitude and direction of the acceleration are utilized to determine the magnitude and direction of the translation. In another embodiment, a gravity sensor detects translation of a digital information appliance by detecting variations in the force of gravity on the device. In an additional embodiment, translation is detected with the use of positional sensors, as shown in FIG. 7. A digital information appliance 702 includes a display device 704 for displaying data 706 to a user 700. A positional sensor 708 disposed proximally to the display device 704 detects the distance of the digital information appliance 702 from the user 700. The digital information appliance 702 detects translational changes of the digital information appliance 702 to manipulate data 706 as displayed on the appliance 702, an example of which was shown in FIG. 6A. Positional sensors may also be disposed on the side 712 and bottom 714 of the digital information appliance 702 so as to enable the digital information appliance 702 to detect position with respect to the environment, such as in a room 714. Positional sensors may include an infrared sensor, sensors that utilize waves to determine position relative to surroundings, such as ultrasonic sensors utilizing techniques similar to radar systems, and the like. It should be apparent that a variety of detectors may be utilized by the present invention as contemplated by a person of ordinary skill in the art and not depart from the spirit and scope of the present invention.

It is believed that the system and method for the utilization of motion input for manipulating a display of data of the present invention and many of its attendant advantages will be understood by the forgoing description. It is believed that it will also be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A digital information appliance suitable for utilization of motion input and for display of data, comprising:

a housing;

a display device for displaying data, the display device disposed in the housing; and a detector for detecting rotation of the digital information appliance about an axis;

wherein a display of data includes a display of a cursor suitable for movement across the display device in response to the detected rotation.

2. The digital information appliance as described in claim 1, wherein the detector includes at least one of an inclinometer, gravity sensor, positional sensor and accelerometer.

3. The digital information appliance as described in claim 1, wherein at least one axis extends through the digital information appliance.

4. The digital information appliance as described in claim 1, wherein the display of data includes at least one of text and graphics.

5. The digital information appliance as described in claim 1, further comprising a calibrator for calibrating an orientation of the digital information appliance with respect to at least one axis.

6. The digital information appliance as described in claim 5, wherein the calibrator is suitable for manual activation.

7. The digital information appliance as described in claim 1, wherein the display of data is scrolled in response to the detected rotation.

8. The digital information appliance as described in claim 7, wherein the display of data is scrolled in an amount on the display device proportional to an amount of detected rotation.

9. The digital information appliance as described in claim 7, wherein the display of data is scrolled at a rate on the display device proportional to an amount of detected rotation.

10. The digital information appliance as described in claim 1, wherein the display of the cursor is moved at a rate on the display device proportional to an amount of detected rotation.

11. The digital information appliance as described in claim 1, wherein the display of the cursor is moved in an amount on the display device proportional to an amount of detected rotation.

12. A method for manipulating a display of data on a digital information appliance, comprising;

rotating a digital information appliance about an axis;

detecting the rotation of the digital information appliance; and manipulating a display of data including a cursor in response to the detected rotation in a manner corresponding to the detected rotation so that the cursor is moved in relation to the display of data.

13. The method as described in claim 12, wherein at least one axis extends through the digital information appliance.

14. The method as described in claim 12, wherein the data includes at least one of text and graphics.

15. The method as described in claim 12, further comprising calibrating an orientation of the digital information appliance with respect to at least one axis.

16. The method as described in claim 12, wherein the manipulating step includes scrolling the display of data in response to the detected rotation.

17. The method as described in claim 16, wherein the display of data is scrolled in an amount across a display device proportional to an amount of detected rotation.

18. The method as described in claim 16, wherein the display of data is scrolled at a rate on the display device proportional to an amount of detected rotation.

19. The method as described in claim 12, wherein the display of the cursor is moved in an amount on the display device proportional to an amount of detected rotation.

20. The method as described in claim 12, wherein the display of the cursor is moved at a rate on the display device proportional to an amount of detected rotation.

21. A digital information appliance suitable for utilization of motion input and for display of data, comprising:

a housing;

a display device for displaying data, the display device disposed in the housing; and a detector for detecting translation of a digital information appliance along an axis from a first location to a second location;

wherein a display of data is at least one of enlarged and reduced in response to the detected translation so as to appear as a generally uniform size to a user viewing the display of data when the digital information appliance is in the second location as when the digital information appliance was in the first location.

22. The digital information appliance as described in claim 21, wherein the detector includes at least one of an inclinometer, gravity sensor, positional sensor and accelerometer.

23. The digital information appliance as described in claim 21, wherein at least one axis extends through the digital information appliance.

24. The digital information appliance as described in claim 21, wherein the display of data includes at least one of text and graphics.

25. The digital information appliance as described in claim 21, further comprising a calibrator for calibrating the distance of the digital information appliance from a point with respect to at least one axis.

26. The digital information appliance as described in claim 25, wherein the calibrator is suitable for manual activation.

27. The digital information appliance as described in claim 21, wherein the display of data is at least one of enlarged and reduced in an amount on the display device proportional to an amount of detected translation.

28. A method for manipulating a display of data a digital information appliance, comprising;

translating a digital information appliance along an axis from a first location to a second location with respect to a user;

detecting the translation of the digital information appliance; and manipulating a display of data in response to the detected translation wherein the display of data is at least one of enlarged and reduced in response to the detected translation so that the display of data appears as a generally similar size at the second location as the first location with respect to the user.

29. The method as described in claim 28, wherein at least one axis extends through the digital information appliance.

30. The method as described in claim 28, wherein the display of data includes at least one of text and graphics.

31. The method as described in claim 28, further comprising calibrating the distance of the digital information appliance from a point with respect to at least one axis.

32. A digital information appliance suitable for utilization of motion input and for display of data, comprising:

a housing;

a display device for displaying data, the display device disposed in the housing;

a display of data orientated on the display device with respect to a point of reference; and a detector for detecting rotation of the digital information appliance about an axis;

wherein when the digital information appliance is rotated about the axis, the display of data is manipulated for viewing on the display device so that the display of data appears generally oriented on the display device with respect to the point of reference so that the orientation of the display of data is not affected by rotation of the digital information appliance.

33. The digital information appliance as described in claim 32, wherein the detector includes at least one of an inclinometer, gravity sensor, positional sensor and accelerometer.

34. The digital information appliance as described in claim 32, wherein at least one axis extends perpendicularly through the digital information appliance.

35. The digital information appliance as described in claim 32, wherein the display of data includes at least one of text and graphics.

36. The digital information appliance as described in claim 32, further comprising a calibrator for calibrating an orientation of the digital information appliance with respect to at least one axis.

37. The digital information appliance as described in claim 36, wherein the calibrator is suitable for manual activation.

38. A method for manipulating a display of data on a digital information appliance, comprising;

displaying data on a digital information appliance orientated on a display device with respect to a point of reference;

rotating the digital information appliance about an axis;

detecting the rotation of the digital information appliance; and manipulating a display of data in response to the detected rotation;

wherein the display of data is manipulated for viewing on the display device so as to keep the display of data orientated on the display device with respect to the point of reference so that the orientation of the display of data is not affected by the rotation of the digital information appliance about the axis.

39. The method as described in claim 38, wherein at least one axis extends through the digital information appliance.

40. The method as described in claim 38, wherein the data includes at least one of text and graphics.

41. The method as described in claim 40, further comprising calibrating an orientation of the digital information appliance with respect to at least one axis.

42. The digital information appliance as described in claim 21, wherein a portion of the digital information appliance is oriented at an angle from a user, the portion of the appliance further away from the user has a corresponding portion of the display manipulated accordingly so that the display of data appears as a generally uniform size to the user viewing the display.

43. A method for manipulating a display of data on a digital information appliance, comprising;

rotating a digital information appliance about an axis;

detecting the rotation of the digital information appliance; and manipulating a display of in response to the detected rotation in a manner corresponding to the detected rotation wherein a portion of the digital information appliance is oriented at an angle from a user, the portion of the appliance further away from the user has a corresponding portion of the display manipulated accordingly so that the display of data appears as a generally uniform size to the user viewing the display.

44. The method as described in claim 43, further comprising:

translating a digital information appliance along an axis from a first location to a second location with respect to a user;

detecting the translation of the digital information appliance; and manipulating a display of data in response to the detected translation, wherein the display of data is at least one of enlarged and reduced in response to the detected translation so that the display of data appears as a generally similar size at the second location as the first location with respect to the user.

* * * * *